US011698087B2

(12) United States Patent
Tsorng et al.

(10) Patent No.: US 11,698,087 B2
(45) Date of Patent: Jul. 11, 2023

(54) MODULAR POLE-MOUNTING SYSTEM FOR SUPPORTING TELECOMMUNICATION DEVICES

(71) Applicant: Quanta Computer Inc., Taoyuan (TW)

(72) Inventors: Yaw-Tzorng Tsorng, Taoyuan (TW); Ming-Lung Wang, Taoyuan (TW); Jia-Lin Liu, Taoyuan (TW)

(73) Assignee: QUANTA COMPUTER, INC., Taoyuan (TW)

( * ) Notice: Subject to any disclaimer, the term of this patent is extended or adjusted under 35 U.S.C. 154(b) by 294 days.

(21) Appl. No.: 17/247,524

(22) Filed: Dec. 15, 2020

(65) Prior Publication Data

US 2022/0112910 A1   Apr. 14, 2022

Related U.S. Application Data

(60) Provisional application No. 63/089,222, filed on Oct. 8, 2020.

(51) Int. Cl.
*F16M 11/00* (2006.01)
*F16B 2/06* (2006.01)
*F16M 13/02* (2006.01)
*H01Q 1/12* (2006.01)

(52) U.S. Cl.
CPC ............. *F16B 2/065* (2013.01); *F16M 13/02* (2013.01); *H01Q 1/1228* (2013.01)

(58) Field of Classification Search
CPC .......... F16B 2/065; F16B 2/12; F16B 5/0685; F16M 13/02; H01Q 1/1228; H01Q 1/246
See application file for complete search history.

(56) References Cited

U.S. PATENT DOCUMENTS

| 6,664,937 | B2 * | 12/2003 | Vermette | H01Q 1/1228 343/882 |
| 7,106,273 | B1 * | 9/2006 | Brunson | H01Q 1/246 343/890 |
| 10,526,810 | B1 * | 1/2020 | Boos | E04H 12/32 |
| 2011/0147554 | A1 * | 6/2011 | Liao | F16B 2/12 248/226.11 |
| 2020/0185827 | A1 * | 6/2020 | Kaistha | H01Q 1/1228 |
| 2021/0075083 | A1 * | 3/2021 | Udagave | H01Q 1/1207 |
| 2021/0359390 | A1 * | 11/2021 | Han | H01Q 1/12 |
| 2021/0408661 | A1 * | 12/2021 | Yoo | H01Q 1/125 |
| 2022/0052433 | A1 * | 2/2022 | Klein | F16F 1/3835 |
| 2022/0104384 | A1 * | 3/2022 | Chen | H04Q 1/04 |

(Continued)

*Primary Examiner* — Amy J. Sterling
(74) *Attorney, Agent, or Firm* — Nixon Peabody LLP

(57) ABSTRACT

A system for mounting a telecommunication device to a pole comprises a pole-mount kit and a first bracket. The pole-mount kit has first and second clamps for engaging opposite sides of the pole. The pole-mount kit has threaded fasteners extending through openings in the first and second clamps such that a first one of the threaded fasteners is on one side of the pole, and a second one of the threaded fasteners is on the other side of the pole. The threaded fasteners retain the first and second clamps in a fixed engagement on the pole. The first clamp has at least one bore extending through the first clamp in a direction that is transverse to the openings. The first bracket is fixed to the first clamp via a first clamp fastener that extends through the bore. The first bracket is used for mounting the telecommunication device.

20 Claims, 4 Drawing Sheets

(56) References Cited

U.S. PATENT DOCUMENTS

| | | | | |
|---|---|---|---|---|
| 2022/0115762 A1* | 4/2022 | Tsorng | ............... | H01Q 1/1228 |
| 2022/0140465 A1* | 5/2022 | Chen | ............... | H01Q 1/1264 |
| | | | | 343/882 |
| 2022/0282802 A1* | 9/2022 | Guiraud | ............... | F16B 2/065 |
| 2022/0316650 A1* | 10/2022 | Brandt | ............... | F16M 11/2028 |
| 2022/0344798 A1* | 10/2022 | Park | ............... | H01Q 1/1242 |
| 2022/0359973 A1* | 11/2022 | Lapalme | ............... | H01Q 1/246 |

\* cited by examiner

MODULAR POLE-MOUNTING SYSTEM FOR SUPPORTING TELECOMMUNICATION DEVICES

RELATED APPLICATIONS

This application claims priority under 35 U.S.C. § 119 to U.S. Provisional Application No. 63/089,222, entitled "FLEXIBLE POLE MOUNT KIT WHICH CAN SUPPORT MULTI-EQUIPMENT", and filed on Oct. 8, 2020. The contents of that application are hereby incorporated by reference in their entirety.

FIELD OF THE INVENTION

The present invention relates generally to a mounting system for a pole and, more specifically, to a mounting system that is easy to assemble and is modular in its ability to support various pieces of telecommunication equipment, such as radio devices and antenna devices.

BACKGROUND OF THE INVENTION

Cellular networks rely on radio devices and antenna devices that are mounted on support structures that extend away from the ground. Some of those support structures are very tall, oftentimes at heights of 100 feet or more. The devices are typically mounted using mounting brackets on poles or other structures. It is often important for these devices to be aligned as accurately as possible to ensure optimization of signal exchange, which can be difficult at the heights involved.

Advancements in technology have led to the current 5G antenna and radio devices, which are typically located within a rectangular housing configuration. In 5G high-bandwidth links, several 5G antenna and radio devices are typically installed in close proximity on the same pole. As such, a need exists for an improved mounting system for the 5G telecommunication devices that is convenient to use and permits proper alignment of multiple 5G telecommunication devices.

SUMMARY OF THE INVENTION

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings and each claim.

According to one aspect of the present disclosure, a system for mounting a telecommunication device to a pole comprises a pole-mount kit and a first bracket. The pole-mount kit has first and second clamps for engaging opposite sides of the pole. The pole-mount kit also has a plurality of threaded fasteners extending through openings in the first and second clamps such that at least a first one of the plurality of threaded fasteners is on one side of the pole and a second one of the plurality of threaded fasteners is on the other side of the pole. The threaded fasteners retain the first and second clamps in a fixed engagement on the pole. The first clamp has at least one bore extending through the first clamp in a direction that is transverse to the openings. The first bracket is fixed to the first clamp via a first clamp fastener that extends through the at least one bore. The first bracket is used for mounting the telecommunication device.

According to a configuration of the above implementation, the first clamp includes a boss that extends from a side surface of the first clamp. The bore extends through boss, and the first bracket engages the boss in response to the first clamp fastener being tightened.

According to another configuration of the above implementation, the system further includes a second bracket for mounting a second telecommunication device to the first clamp. The first clamp includes a first pair of bosses on a first side thereof and a second pair of bosses on a second side thereof. The first bracket is fixed against the first pair of bosses. The second bracket is fixed against the second pair of bosses in response to the first clamp fastener being tightened.

According to a further configuration of the above implementation, each of the first and second brackets includes threaded bores for receiving screws to mount, respectively, the first and second telecommunication devices.

In a further aspect of the above implementation, the number of the plurality of threaded fasteners is four, and the first clamp includes four openings for receiving the four threaded fasteners.

In yet a further aspect of the above implementation, the first clamp has a generally rectangular-shaped main body with four corners. Each of the four openings is located adjacent to one of the four corners. Two of the four threaded fasteners are located on one side of the pole, and the other two of the four threaded fasteners are located on the other side of the pole.

In another aspect of the above implementation, the system includes a second bracket that is fixed to the first clamp. The second bracket is used for mounting a second telecommunication device. The at least one bore extends through a middle region of the rectangular-shaped body of the first clamp between the four openings. The first bracket is fixed against a first side of the rectangular-shaped main body in response to the first clamp fastener being tightened. The second bracket is fixed against a second side of the rectangular-shaped main body in response to the first clamp fastener being tightened.

According to a further configuration of the above implementation, the system includes a second clamp fastener extending through a second bore in the middle region of the rectangular-shaped main body of the first clamp. The first bracket is fixed against the first side of the rectangular-shaped main body in response to both the first and second clamp fasteners being tightened. The second bracket is fixed against the second side of the rectangular-shaped main body in response to both the first and second clamp fasteners being tightened.

According to another configuration of the above implementation, each of the first and second brackets is a U-shaped member having four holes. The first clamp fastener passes through two of the four holes in the first bracket and two of the four holes in the second bracket. The second clamp fastener passes through the other two of the four holes in the first bracket and the other two of the four holes in the second bracket.

In yet a further aspect of the above implementation, the first clamp includes bosses on the first side of the rectangular-shaped body and the second side of the rectangular-shaped body. The first and second brackets engage the bosses of the first clamp.

In another aspect of the above implementation, the first clamp includes a concave surface for receiving the pole.

Another aspect of the present disclosure includes a system for mounting a plurality of telecommunication devices to a pole. The system comprises a pole-mount kit, a first bracket, and a second bracket. The pole-mount kit has first and second clamps for engaging opposite sides of the pole. The first clamp has a first main body and a pair of first bosses on opposing sides of the first main body. The second clamp has a second main body and a pair of second bosses on opposing sides of the second main body. The pole-mount kit further includes a plurality of threaded fasteners for retaining the first and second clamps in a fixed engagement on opposing sides of the pole. The first clamp has a first bore extending through the first main body in a direction that is transverse to the direction of the plurality of threaded fasteners. The second clamp has a second bore extending through the second main body in a direction that is transverse to the direction of the plurality of threaded fasteners. The first bracket is in fixed engagement with one of the pair of first bosses of the first clamp via a first clamp fastener that extends through the first bore. The first bracket is used for mounting a first one of the plurality of telecommunication devices. The second bracket is in fixed engagement with one of the pair of second bosses of the second clamp via a second clamp fastener that extends through the second bore. The second bracket is used for mounting a second one of the plurality of telecommunication devices.

According to another configuration of the above implementation, the system further includes a third bracket and a fourth bracket. The third bracket is in fixed engagement with the other one of the pair of first bosses of the first clamp via the first clamp fastener. The third bracket is used for mounting a third one of the plurality of telecommunication devices. The fourth bracket is in fixed engagement with the other one of the pair of second bosses of the second clamp via the second clamp fastener. The fourth bracket is used for mounting a fourth one of the plurality of telecommunication devices.

According to another configuration of the above implementation, the first bore extends through the pair of first bosses. The second bore extends through the pair of second bosses.

According to another aspect of the above implementation, the first clamp includes an additional pair of first bosses on opposing sides of the first main body. The first clamp further includes an additional first bore extending through the additional pair of first bosses for receiving an additional first clamp fastener that retains the first and third brackets in fixed engagement with the additional pair of first bosses. The second clamp includes an additional pair of second bosses on opposing sides of the second main body. The second clamp further includes an additional second bore extending through the additional pair of second bosses for receiving an additional second clamp fastener that retains the second and fourth brackets in fixed engagement with the additional pair of second bosses.

According to a further aspect of the above implementation, the four telecommunication devices are remote radio units.

According to yet a further aspect of the above implementation, the first bore extends through the pair of first bosses, and the second bore extends through the pair of second bosses.

A further aspect of the present disclosure includes a method of connecting a plurality of telecommunication devices to a pole. The method comprises, by use of a plurality of threaded fasteners located outside the pole, clamping a first clamp structure and a second clamp structure onto opposite sides of the pole. The first clamp structure has a first main body and a pair of first bosses on opposing sides of the first main body. The first clamp structure also has a first bore extending through the first main body and the pair of first bosses. The method further includes fastening a first bracket to one of the pair of first bosses of the first clamp structure via a first clamp fastener that extends through the first bore, and fastening a second bracket to the other of the pair of first bosses of the first clamp structure via the first clamp fastener that extends through the first bore. The method further includes mounting a first one of the plurality of telecommunication devices on the first bracket, and mounting a second one of the plurality of telecommunication devices on the second bracket.

According to one aspect of the above implementation, the second clamp structure has a second main body and a pair of second bosses on opposing sides of the second main body. The second clamp structure has a second bore extending through the second main body and the pair of second bosses. The method further includes fastening a third bracket to one of the pair of second bosses of the second clamp structure via a second clamp fastener that extends through the second bore, and fastening a fourth bracket to the other of the pair of second bosses of the second clamp structure via the second clamp fastener that extends through the second bore. The method also includes mounting a third one of the plurality of telecommunication devices on the third bracket, and mounting a fourth one of the plurality of telecommunication devices on the fourth bracket.

According to yet a further aspect of the above implementation, the first bracket has a U-shaped configuration. The fastening of the first bracket includes passing the first fastener through two holes in the first bracket.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

Figure 1:
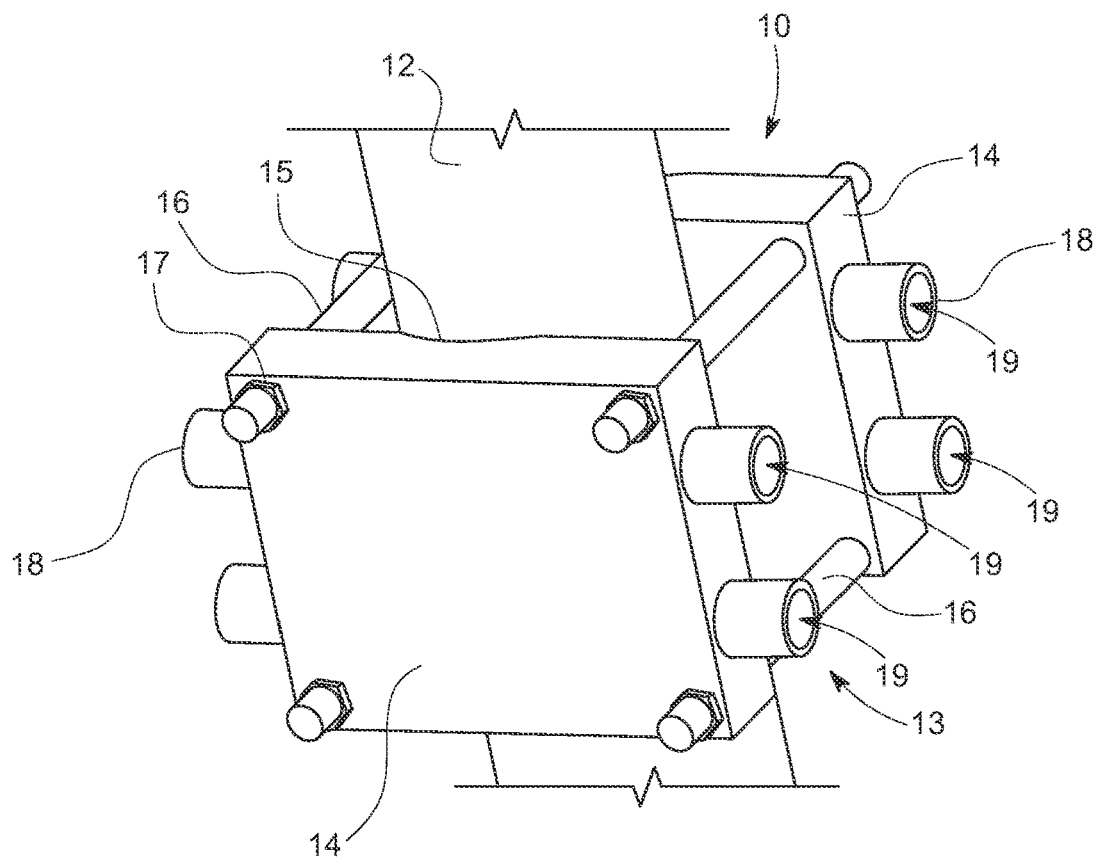
FIG. 1 is a perspective view of a pole-mount kit within the device-mounting system, according to one embodiment of the present disclosure.

While the invention is susceptible to various modifications and alternative forms, specific implementations have been shown by way of example in the drawings and will be described in further detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Various embodiments are described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The various embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

FIG. 1 illustrates a device-mounting system 10 for attaching telecommunication devices to a pole 12. The telecommunication devices may include remote radio units (RRU), antenna-integrated radios (AIR), active-antenna units (AAU), or other devices providing signal transmission within a telecommunication network.

Figure 3:
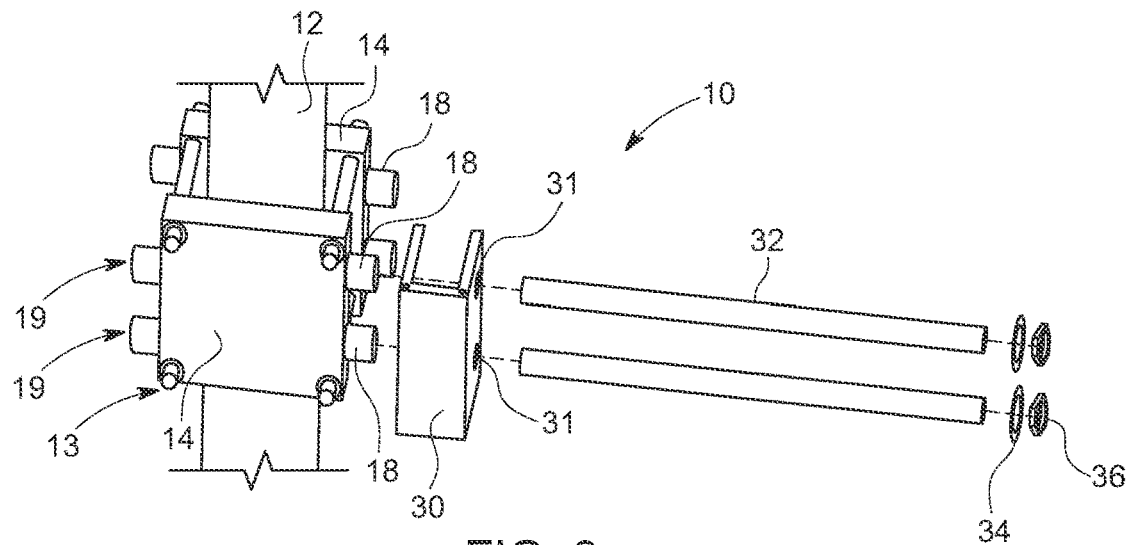
FIG. 3 is an exploded perspective view of the device-mounting system with a bracket being attached to the pole-mount kit.

The device-mounting system 10 includes a pole-mount kit 13 having a pair of clamps 14 that are configured to fit on opposing sides of the pole 12, which is typically about 90 mm to 120 mm in diameter. The clamps 14 preferably include a concave recess 15 that is shaped to receive a portion of the periphery of the pole 12. The pole-mount kit 13 further includes a plurality of bolts 16 that serve to bring the pair of clamps 14 into tight engagement on the pole 12 by use of locking nuts 17, such that slippage on the pole 12 is inhibited. Washers may also be used in conjunction with the locking nuts 17. The device-mounting system 10 also includes a bracket 30, which is shown in FIG. 3 and described in more detail below.

As shown in FIG. 1, each of the clamps 14 includes a plurality of bosses 18 extending from the side surfaces of the main body of the clamp 14. Each of the clamps 14 includes two through-bores 19. One through-bore 19 extends through the main body of the clamp 14 and the pair of lower bosses 18. The other through-bore 19 extends through the main body of the clamp 14 and the pair of upper bosses 18. The through-bores 19 extend through the clamps 14 in a direction that is transverse to the direction of the plurality of bolts 16.

Figure 2:
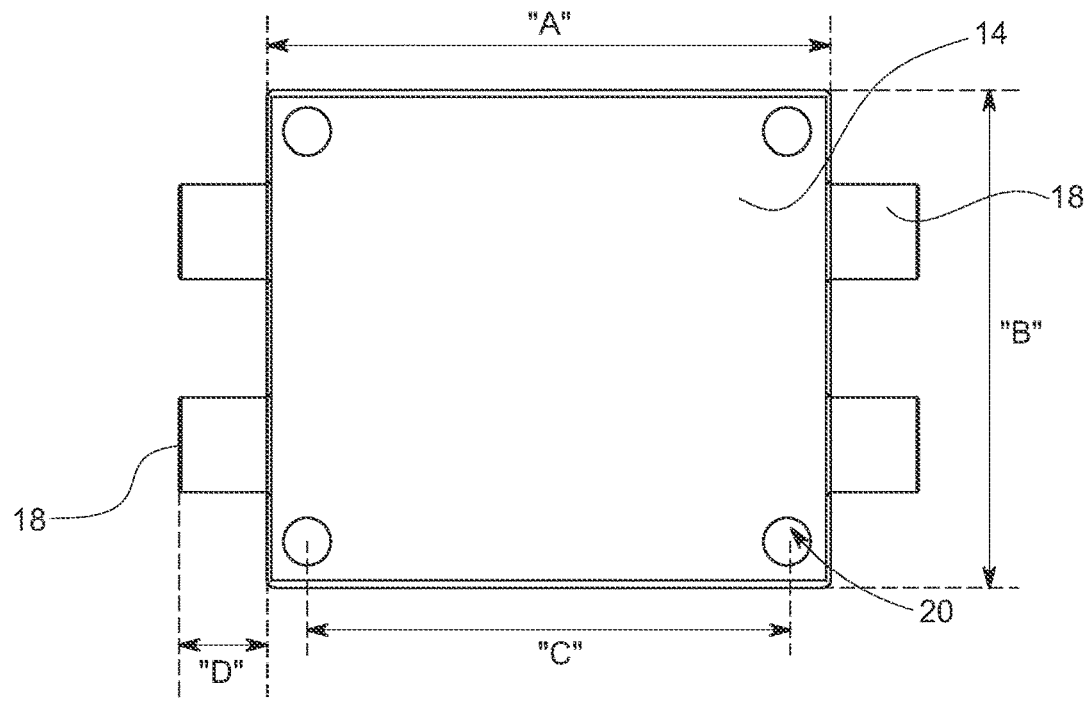
FIG. 2 a side view of one of the clamps of the pole-mount kit in FIG. 1.

FIG. 2 illustrates a side view of the clamp 14, which is generally rectangular in shape. The width "A" and length "B" of the clamp 14 are typically between 120 mm and 200 mm. The distance "C" between openings 20 in the clamp 14 that receive the bolts 16 (FIG. 1) is generally between 125 mm and 150 mm such that there is no interference between the bolts 16 and the pole 12, as shown in FIG. 1. The bosses 18 extend away from sides surfaces of the main body of the clamp 14 by a distance "D" of about 15 mm to 30 mm. The clamps 14 are preferably made of a metal, such as aluminum or stainless steel (e.g., SUS304 stainless steel).

In one embodiment, the width "A" and length "B" of the clamp 14 are approximately 160 mm and 140 mm, respectively. The distance "C" between the openings 20 in the clamp 14 is approximately 135 mm. The bosses 18 extend away from the main body of the claim 14 by a distance "D" of approximately 25 mm. The thickness (i.e., the dimensional depth not shown in FIG. 2) of the main body of the clamp 14 is about 35 mm.

FIG. 3 illustrates the bracket 30 of the device-mounting system 10 as well as the pole-mount kit 13 that is fixed to the pole 12, as described relative to FIG. 1. In the illustrated embodiment, the bracket 30 of the device-mounting system 10 is a U-shaped member that includes a plurality of holes 31. Two bolts 32 extend through the holes 31 in the bracket 30 before passing into the through-bores 19 starting at the bosses 18 of the clamp 14. For tightening the bracket 30 against the bosses 18, a combination of washers 34 and nuts 36 are threaded onto the bolts 32.

Figure 4:
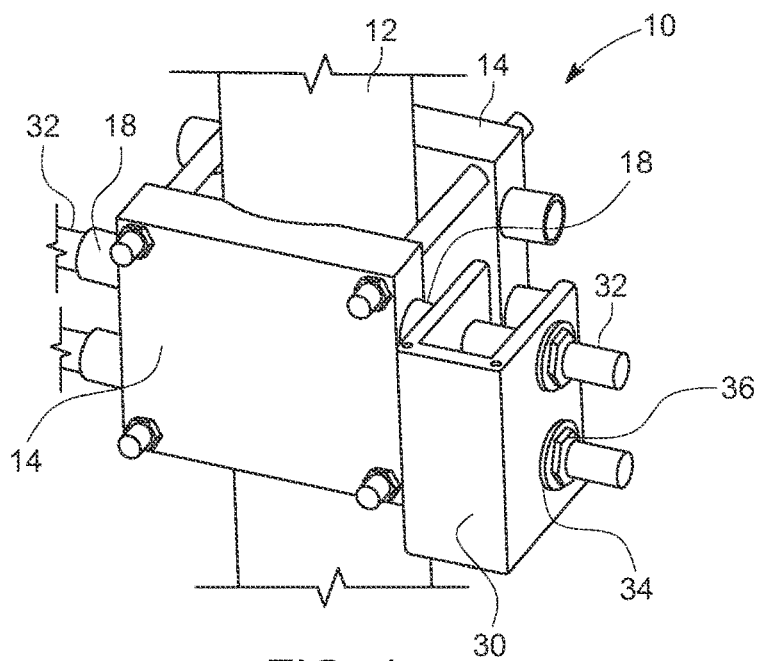
FIG. 4 is a perspective view of the bracket attached to the pole-mount kit.

FIG. 4 is a perspective view of the device-mounting system 10 after it has been fully assembled and attached to the pole 12. The bracket 30 is offset from main body of the clamp 14 by a distance that is dictated by dimension "D" of the bosses 18 (shown in FIG. 2). As illustrated in FIG. 4, the bolts 32 extend through the holes 31 (FIG. 3) in the U-shaped bracket 30, enter the through-bores 19 (FIG. 3) of the bosses 18 adjacent to the bracket 30, and extend out of the bosses 18 on the opposing side of the clamp 14. The washers 34 and nuts 36 are used on both ends of the bolts 32 to fasten the bracket 30 tightly against the exterior side surfaces of the bosses 18 of the clamp 14.

Figure 5:
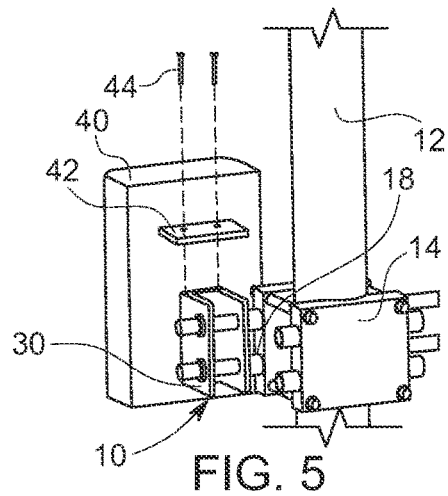
FIG. 5 illustrates a radio or antenna device being attached to the bracket of FIG. 4.

FIG. 5 illustrates the device-mounting system 10 in use to mount a telecommunication device 40. The pair of clamps 14 are tightly engaged (i.e., clamped) onto the pole 12. The bracket 30 is tightly mounted onto one of the clamps 14 at the bosses 18, as described above. The telecommunication device 40 includes a flange 42 with openings that receive a pair of screws 44 that are threaded into corresponding threaded bores within the bracket 30. Preferably, the primary surface of the telecommunication device 40 rests against the outer main surface of the clamp 30 to provide structural support. FIG. 5 illustrates one embodiment of the present disclosure in which only a single telecommunication device 40 is mounted to the device-mounting system 10.

Figure 6:
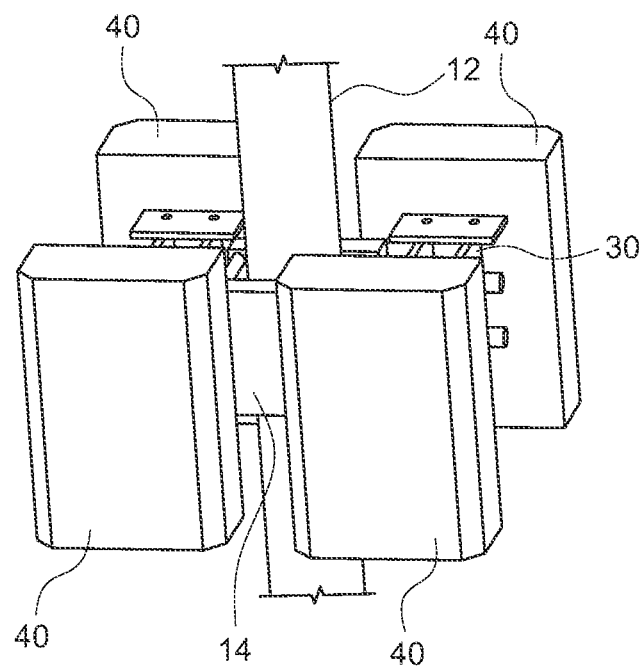
FIG. 6 is a perspective view of four devices attached to the device-mounting system via four brackets.

FIG. 6 illustrates the modularity of the device-mounting system 10 (shown in FIG. 5) in that up to four communication devices 40 can be mounted in a fixed arrangement on the pole 12. Two communication devices 40 can be mounted to the first one of the clamps 40 via the brackets 30. Likewise, two communication devices 40 can be mounted to the second one of the clamps 40 via the brackets 30. In other embodiments, it may be that only two or three communication devices 40 are coupled to the pole 12 via the device-mounting system 10. Though the embodiment of FIG. 6 shows the modularity of the device-mounting system 10 by illustrating four identical communication devices 40, different types and sizes of communication devices 40 can be simultaneously mounted to the device-mounting system 10.

Figure 7:
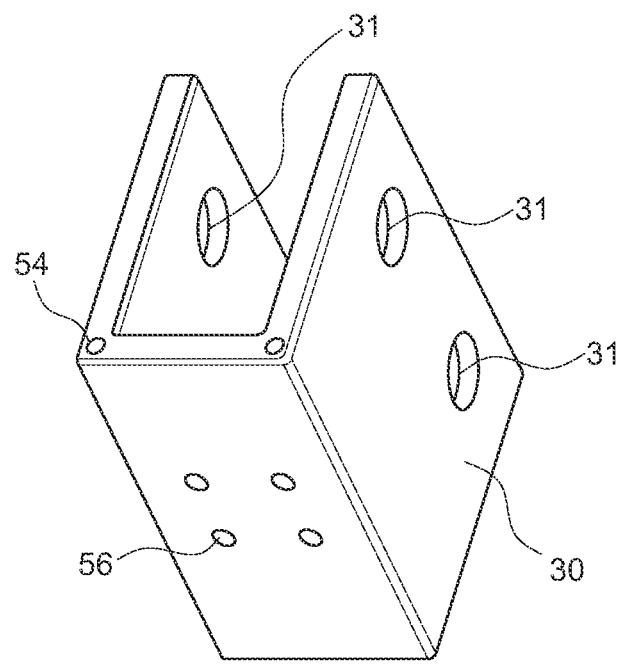
FIG. 7 is a perspective view of the bracket illustrated in FIGS. 3-6.

FIG. 7 also illustrates the enhanced modularity of the device-mounting system 10 that is derived from the bracket 30. The bracket 30 includes four holes 31 (only three holes 31 shown in FIG. 7) that allow it to receive the two bolts 32, shown in FIGS. 3 and 4. The bracket 30 includes a first set of threaded holes 54 on top surface that receive the screws 44 associated with the telecommunication device 40 in FIG. 5. The bracket 30 also includes a second set of threaded holes 56 that allow the bracket 30 to receive screws (or other fasteners) from a different type of telecommunication device. By providing multiple fastening features on the same bracket 30, the same bracket 30 can be coupled to multiple types of telecommunication devices.

Figure 8:
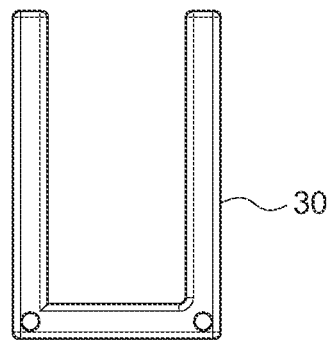
FIG. 8 is an end view of the bracket of FIGS. 3-6.
Figure 9:
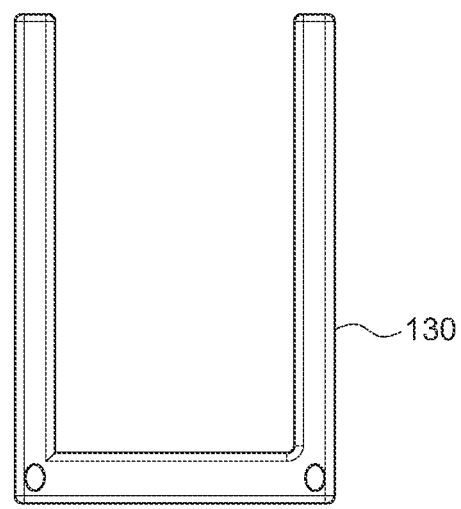
FIG. 9 is an end view of an alternative larger bracket that can be used within the device-mounting system.

FIGS. 8 and 9 show additional modularity of the device-mounting system 10 (FIG. 5) in that different brackets may be used within the same device-mounting system 10. FIG. 8 illustrates the bracket 30 that has been described above. FIG. 9 illustrates a larger bracket 130 that is equally compatible with the pole-mount kit 13 (FIGS. 1, 2, and 4) in that it includes four holes (not shown in FIG. 9) to receive the same bolts 32 (FIG. 4). The larger bracket 130 may be used for other types and sizes of telecommunication devices. It should be understood that, although the brackets 30, 130 have a U-shaped configuration, other bracket configurations can be used in conjunction with the pole-mount kit 13 in other embodiments of the present disclosure.

Furthermore, the illustrated embodiments of the device-mounting system 10 have been described as using various common threaded fasteners, such as screws and bolts. It should be understood that these specific fasteners are only exemplary, and other fastening systems may be used in their place. For example, a bolt having a fixed head can be replaced by a threaded rod with multiple nuts. Alternatively, one of the components (e.g., one of the clamps 14) may have integrated, threaded, peg-like structures that act as threaded fasteners. Screws to be received in threaded bores can be replaced by threaded rods with nuts as well. Elongated clips can also be used as well. In short, the present disclosure contemplates the substitution of various fasteners to be used within the overall configuration of the device-mounting system 10.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A system for mounting first and second telecommunication devices to a pole, comprising:
   a pole-mount kit having first and second clamps for engaging opposite sides of the pole, each of the first and second clamps having a main body that engages the pole, each of the main bodies of the first and second clamps including side surfaces that face away from the pole, the pole-mount kit including a plurality of threaded fasteners extending through openings in the main bodies of the first and second clamps such that at least a first one of the plurality of threaded fasteners is on one side of the pole and a second one of the plurality of threaded fasteners is on the other side of the pole, the plurality of threaded fasteners for retaining the first and second clamps in a fixed engagement on the pole, the plurality of threaded fasteners being located inward toward the pole relative to the side surfaces of the main bodies, the main body of the first clamp having at least one bore extending through the first clamp in a direction that is transverse to the openings in the main body of the first clamp;
a first bracket fixed to the first clamp via a first clamp fastener that extends through the at least one bore, the first bracket being fixed to a first one of the side surfaces of the main body of the first clamp, the first bracket for mounting the telecommunication device; and
a second bracket fixed to the first clamp at a second one of the side surfaces of the main body of the first clamp, the second one of the side surfaces being opposite to the first one of the side surfaces on the main body, the second bracket for mounting the second telecommunication device.

2. The mounting system of claim 1, wherein the first clamp includes a boss that extends from a side surface of the first clamp, the bore extending through boss, the first bracket engaging the boss in response to the first clamp fastener being tightened.

3. The mounting system of claim 1, wherein the first clamp includes a first pair of bosses on the first one of the side surfaces and a second pair of bosses on the second one of the side surfaces, the first bracket being fixed against the first pair of bosses and the second bracket being fixed against the second pair of bosses in response to the first clamp fastener being tightened.

4. The mounting system of claim 3, wherein each of the first and second brackets includes threaded bores for receiving screws to mount, respectively, the first and second telecommunication devices.

5. The mounting system of claim 1, wherein the number of the plurality of threaded fasteners is four and the first clamp includes four openings for receiving the four threaded fasteners.

6. The mounting system of claim 5, wherein the first clamp has a generally rectangular-shaped main body with four corners, each of the four openings being located adjacent to one of the four corners, and wherein two of the four threaded fasteners are located on one side of the pole and the other two of the four threaded fasteners are located on the other side of the pole.

7. The mounting system of claim 6, wherein the at least one bore extends through a middle region of the rectangular-shaped body of the first clamp between the four openings, the first bracket being fixed against the first one of the side surfaces of the rectangular-shaped main body and the second bracket being fixed against the second one of the side surfaces of the rectangular-shaped main body in response to the first clamp fastener being tightened.

8. The mounting system of claim 7, further including a second clamp fastener extending through a second bore in the middle region of the rectangular-shaped main body of the first clamp, the first bracket being fixed against the first one of the side surfaces of the rectangular-shaped main body and the second bracket being fixed against the second one of the side surfaces of the rectangular-shaped main body in response to both the first and second clamp fasteners being tightened.

9. The mounting system of claim 8, wherein each of the first and second brackets is a U-shaped member having four holes, the first clamp fastener passing through two of the four holes in the first bracket and two of the four holes in the second bracket, the second clamp fastener passing through the other two of the four holes in the first bracket and the other two of the four holes in the second bracket.

10. The mounting system of claim 8, wherein the first clamp includes bosses on the first one of the side surfaces of the rectangular-shaped body and the second one of the side surfaces of the rectangular-shaped body, the first and second brackets engaging the bosses of the first clamp.

11. The mounting system of claim 1, wherein the first clamp includes a concave surface for receiving the pole.

12. A system for mounting a plurality of telecommunication devices to a pole, comprising:
a pole-mount kit having first and second clamps for engaging opposite sides of the pole, the first clamp having a first main body and a pair of first bosses on opposing sides of the first main body, the second clamp having a second main body and a pair of second bosses on opposing sides of the second main body, the pole-mount kit further including a plurality of threaded fasteners for retaining the first and second clamps in a fixed engagement on opposing sides of the pole, the first clamp having a first bore extending through the first main body in a direction that is transverse to the direction of the plurality of threaded fasteners, the second clamp having a second bore extending through the second main body in a direction that is transverse to the direction of the plurality of threaded fasteners;
a first bracket in fixed engagement with one of the pair of first bosses of the first clamp via a first clamp fastener that extends through the first bore, the first bracket for mounting a first one of the plurality of telecommunication devices; and
a second bracket in fixed engagement with one of the pair of second bosses of the second clamp via a second clamp fastener that extends through the second bore, the second bracket for mounting a second one of the plurality of telecommunication devices.

13. The mounting system of claim 12, further including:
a third bracket in fixed engagement with the other one of the pair of first bosses of the first clamp via the first clamp fastener, the third bracket for mounting a third one of the plurality of telecommunication devices; and
a fourth bracket in fixed engagement with the other one of the pair of second bosses of the second clamp via the second clamp fastener, the fourth bracket for mounting a fourth one of the plurality of telecommunication devices.

14. The mounting system of claim 13, wherein the first bore extends through the pair of first bosses, and the second bore extends through the pair of second bosses.

15. The mounting system of claim 14, wherein the first clamp includes an additional pair of first bosses on opposing sides of the first main body, the first clamp further including an additional first bore extending through the additional pair of first bosses for receiving an additional first clamp fastener that retains the first and third brackets in fixed engagement to the additional pair of first bosses, and
wherein the second clamp includes an additional pair of second bosses on opposing sides of the second main body, the second clamp further including an additional second bore extending through the additional pair of second bosses for receiving an additional second clamp fastener that retains the second and fourth brackets in fixed engagement to the additional pair of second bosses.

16. The mounting system of claim 15, wherein the four telecommunication devices are remote radio units.

17. The mounting system of claim 12, wherein the first bore extends through the pair of first bosses, and the second bore extends through the pair of second bosses.

18. A method of connecting a plurality of telecommunication devices to a pole, the method comprising:

by use of a plurality of threaded fasteners located outside the pole, clamping a first clamp structure and a second clamp structure onto opposite sides of the pole, the first clamp structure having a first main body and a pair of first bosses on opposing sides of the first main body, the first clamp structure having a first bore extending through the first main body and the pair of first bosses;

fastening a first bracket to one of the pair of first bosses of the first clamp structure via a first clamp fastener that extends through the first bore;

fastening a second bracket to the other of the pair of first bosses of the first clamp structure via the first clamp fastener that extends through the first bore;

mounting a first one of the plurality of telecommunication devices on the first bracket; and mounting a second one of the plurality of telecommunication devices on the second bracket.

19. The method of claim 18, wherein the second clamp structure has a second main body and a pair of second bosses on opposing sides of the second main body, the second clamp structure having a second bore extending through the second main body and the pair of second bosses, and further including, fastening a third bracket to one of the pair of second bosses of the second clamp via a second clamp fastener that extends through the second bore;

fastening a fourth bracket to the other of the pair of second bosses of the second clamp via the second clamp fastener that extends through the second bore;

mounting a third one of the plurality of telecommunication devices on the third bracket; and mounting a fourth one of the plurality of telecommunication devices on the fourth bracket.

20. The method of claim 18, wherein the first bracket has a U-shaped configuration, and wherein the fastening the first bracket includes passing the first fastener through two holes in the first bracket.

* * * * *